United States Patent [19]

Le Dall

[11] 4,275,448
[45] Jun. 23, 1981

[54] ELECTRONIC MEANS FOR CONTROLLING THE REGENERATION OF RESINS IN A RESIN TYPE ION EXCHANGE DEVICE

[75] Inventor: Guy Le Dall, Rueil-Malmaison, France

[73] Assignee: Permo, Rueil-Malmaison, France

[21] Appl. No.: 116,779

[22] Filed: Jan. 30, 1980

Related U.S. Application Data

[63] Continuation-in-part of Ser. No. 963,261, Nov. 24, 1978.

[51] Int. Cl.³ .......................... G06F 15/46; C02F 1/42
[52] U.S. Cl. ...................................... 364/500; 210/97; 210/143; 210/662
[58] Field of Search .................. 364/500, 502, 107; 210/24, 25, 30 R, 33, 35, 96, 97, 141, 142, 143, 662, 103, 104

[56] References Cited
U.S. PATENT DOCUMENTS

| | | | |
|---|---|---|---|
| 3,278,424 | 10/1966 | Griswold | 210/141 X |
| 3,366,241 | 1/1968 | McMorris | 210/142 X |
| 3,969,242 | 7/1976 | Kruse | 210/25 |
| 4,145,279 | 3/1979 | Selby | 210/25 X |

Primary Examiner—Joseph F. Ruggiero
Attorney, Agent, or Firm—Wenderoth, Lind & Ponack

[57] ABSTRACT

An electronic control initiates and controls the regeneration sequence in a resin-type ion exchange apparatus of the type requiring periodic resin regeneration. The electronic control controls the regeneration steps of backwashing, brining and rinsing when respective predetermined fluid flow volumes stored in a memory means pass through the resin. The regeneration sequence may be initiated when a further predetermined fluid flow volume also stored in the memory means passes through the resin. A fluid hardness sensor measures the concentration of objectionable ions for selecting the most advantageous fluid flow volume between regeneration sequences. A brine conductivity sensor determines when the concentration of the regeneration agent falls below the concentration required for adequate regeneration of the resin. An outlet conductivity sensor enables discard or reprocessing of outlet fluid below a predetermined quality. A warning/service alert signals problems or failures in the ion exchange apparatus. A brine electrolysis unit produces a sterilization agent from the regeneration agent.

25 Claims, 16 Drawing Figures

ELECTRONIC MEANS FOR CONTROLLING THE REGENERATION OF RESINS IN A RESIN TYPE ION EXCHANGE DEVICE

The present application is a continuation-in-part of application Ser. No. 963,261 filed Nov. 24, 1978.

BACKGROUND OF THE INVENTION

The present invention is related to resin-type ion exchange devices. Resin-type ion exchange devices have many uses such as the softening of water, deionization of sugar compounds and processing of protein complexes. As the fluid to be processed is passed through a tank containing an ion exchange resin, ions in the fluid to be processed are exchanged with ions found in the resin, thereby removing objectionable ions from the fluid and exchanging them for less objectionable ions found in the resin. During this process the ability of the resin to exchange ions is gradually reduced. That is, as the resin captures the objectionable ions and releases the less objectionable ions, its capacity to continue this exchange process is gradually exhausted. Eventually, a steady state is reached in which no further objectionable ions in the fluid to be processed can be exchanged for the less objectionable ions found in the resin. The point at which this state is reached can be estimated generally from the concentration of the objectionable ions found in the fluid to be processed, the volume of fluid to be processed passing through the ion exchange resin device, the relative chemical activities of the objectionable and less objectionable ions, and other factors. Once this point is reached, the resin can no longer remove the objectionable ions from the fluid to be processed.

It is known in the art of ion exchange resin devices to regenerate the ion exchange resins by chemically removing the objectionable ions from the resin and replacing these with the less objectionable ions. This regeneration process requires the suspension of the ion exchanging process. During this regeneration process, a substance having a high concentration of the less objectionable ions is applied to the ion exchange resin. Because this produces a new balance of concentrations between the respective ions, the ion exchange resin now exchanges the objectionable ions captured during the ordinary process for the less objectionable ions applied during regeneration. As a result of this process, the ability of the ion exchange resin to remove objectionable ions from the fluid to be processed is regenerated. At the same time as the ion exchange resin is regenerated, the device may perform other functions such as backwashing the resin tank in order to remove trapped particulate matter, rinsing the resin tank to remove soluble materials and application of a sterilization agent to prevent bacterial growth.

Since this process of regeneration of the ion exchange resin renders the ion exchange device inoperable and since the ability of the ion exchange device to remove the objectionable ion is controlled in large part by the state of the ion exchange resin, it is most important that the regeneration process be undertaken at appropriate times. Too frequent regeneration of the ion exchange resin leads to unnecessarily rendering the ion exchange device inoperable as well as unnecessary use of energy and materials during the regeneration process. On the other hand, too infrequent regeneration of the ion exchange resins leads to an increase in the concentration of the objectionable ions at the output of the ion exchange device during the periods in which the capacity of the ion exchange resin is substantially exhausted.

SUMMARY OF THE INVENTION

Accordingly, it is an object of the present invention to provide an electronic control means for initiating and controlling the resin regeneration sequence in a resin-type ion exchange apparatus of the type requiring periodic resin regeneration and having at least one electrically actuated valve for controlling the regeneration sequence including:

a flow volume sensor for measuring the volume of fluid passing through the resin;

a memory means for storing a predetermined value loading program, a regeneration initiation program, a regeneration sequence control program including at least the steps of backwashing, brining and rinsing for respective predetermined fluid flow volumes through the resin and a plurality of predetermined values;

a microprocessor calculating means for loading a plurality of predetermined values into the memory means according to the predetermined value loading program, for initiating the regeneration sequence according to the regeneration initiation program and for controlling the regeneration sequence according to the regeneration sequence program by production of valve control signals for backwashing, brining and rinsing the respective predetermined fluid flow volumes; and a programming means for application of at least some of the predetermined values to the microprocessor calculating means for storing in the memory means.

Another object of the present invention is to provide an electronic control means of the above described type in which the regeneration initiation program comprises at least the step of initiating the regeneration sequence after a predetermined fluid volume has passed through the resin and the microprocessor calculating means initiates the regeneration sequence according to this volume based regeneration program.

A further object of the present invention is to provide a resin-type ion exchange device with a volume based regeneration program having an inlet fluid hardness sensor connected to the electronic control means, whereby the predetermined fluid volume between each regeneration cycle is determined according to the sensed hardness of the input fluid.

Another object of the present invention is to provide an electronic control means in a resin-type ion exchange device including a conductivity sensor in the output line and further including a discard valve in the output line for diverting flow of the output fluid from the output line to a drain line when the conductivity sensor determines that the output fluid has a conductivity greater than a predetermined amount.

A still further object of the present invention is to provide an electronic control means including a brine conductivity sensor which determines the concentration of the brine employed as the regeneration agent for the resin tank, whereby a warning or service alert may be generated when the brine concentration falls below a predetermined value.

A still further objection of the present invention is to provide an electronic control means for use in a resin-type ion exchange device including a brine electrolysis unit for production of a sterilization agent for the resin tank from the brine employed as the regeneration agent by electrolysis of the regeneration agent.

BRIEF DESCRIPTION OF THE DRAWINGS

The present invention will now be described in detail in conjunction with the accompanying drawings, in which.

DETAILED DESCRIPTION OF THE PREFERRED EMBODIMENTS

Figure 1:
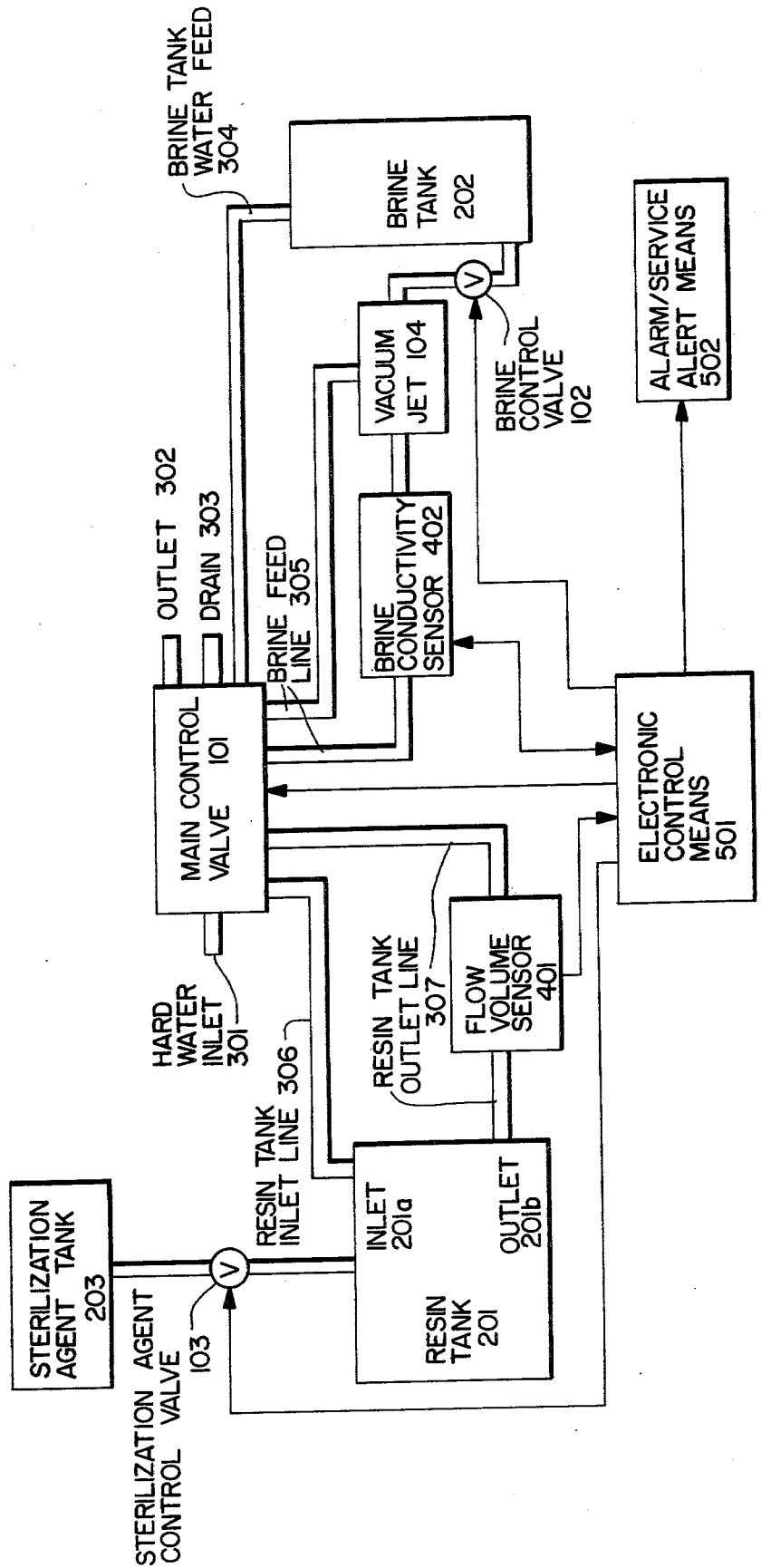
FIG. 1 illustrates an overall system schematic diagram for the electronic control means of the present application in conjunction with a water softening apparatus.

The electronic control means of the present invention will now be described in conjunction with a water-softening apparatus as illustrated in FIG. 1. It is to be understood that the water softening apparatus described in conjunction with the description of the apparatus of the present invention is but one example of a resin-type ion exchange apparatus to which the device of the present invention may be applied.

Figure 2A:
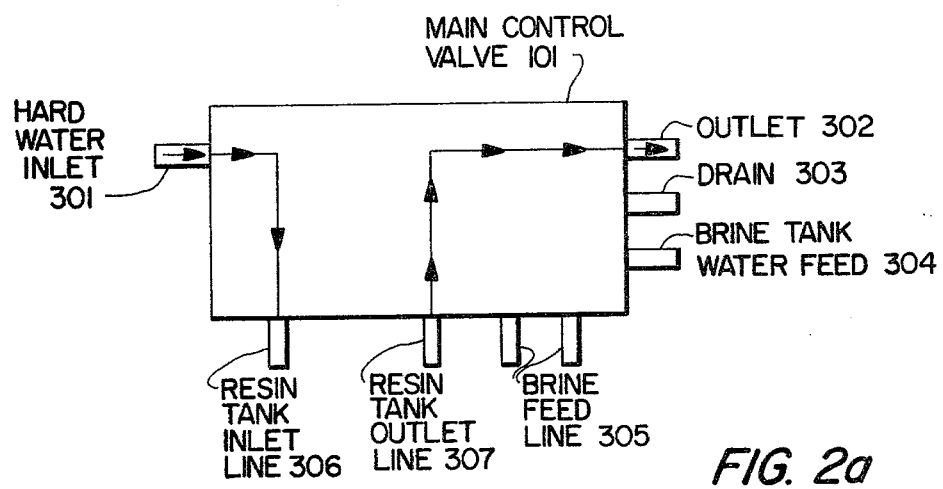
FIGS. 2a to 2d illustrates schematically the main control valve illustrated in FIG. 1 during various portions of the operational cycle of the device.
Figure 2B:
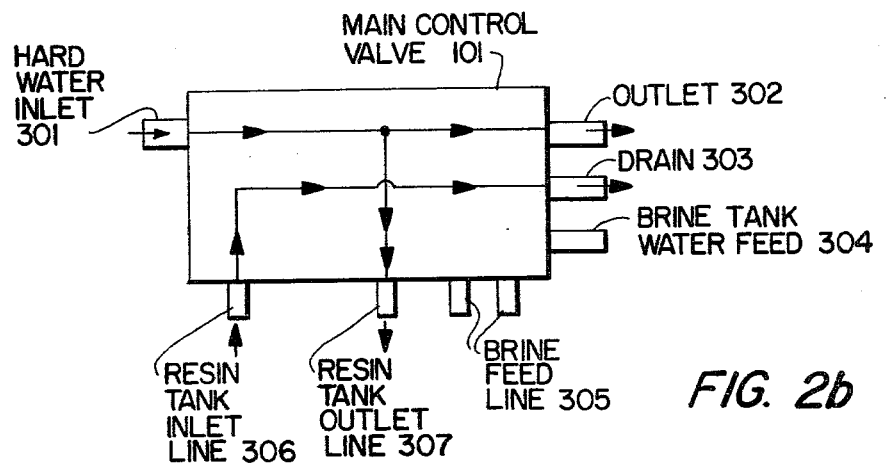

A water softening device to which the electronic control means may be applied is illustrated in FIG. 1. This water softening means includes a hard water inlet 301 and a main control valve 101. Hard water to be treated enters the device through the hard water inlet 301 and is controlled as described below by the main control valve 101. Main control valve 101 may be of the type disclosed in U.S. Pat. No. 3,683,961 issued to Launay et al, Aug. 15, 1972 main control valve 101 is also coupled to outlet 302, drain 303, brine tank water feed 304, brine feed line 305, resin tank inlet line 306, resin tank outlet line 307 and is controlled by electronic control means 501. The brine tank water feed is connected to brine tank 202. The brine feed line 305 is connected to vacuum jet 104. Also connected to vacuum jet 104 is the brine conductivity sensor 402 and the brine control valve 102 which is further connected to brine tank 202 and which is controlled by electronic control means 501. The main control valve 101 is connected to resin tank 201 via two lines; the resin tank inlet line 306 is connected to the resin tank inlet 210a and the resin tank outlet line 307 is connected to the resin tank outlet 201b via the flow volume sensor 401. The operation of main control valve 101 which is illustrated in FIGS. 2a to 2b will be explained in detail in conjunction with the description of the operation of the water softening apparatus.

Figure 3:
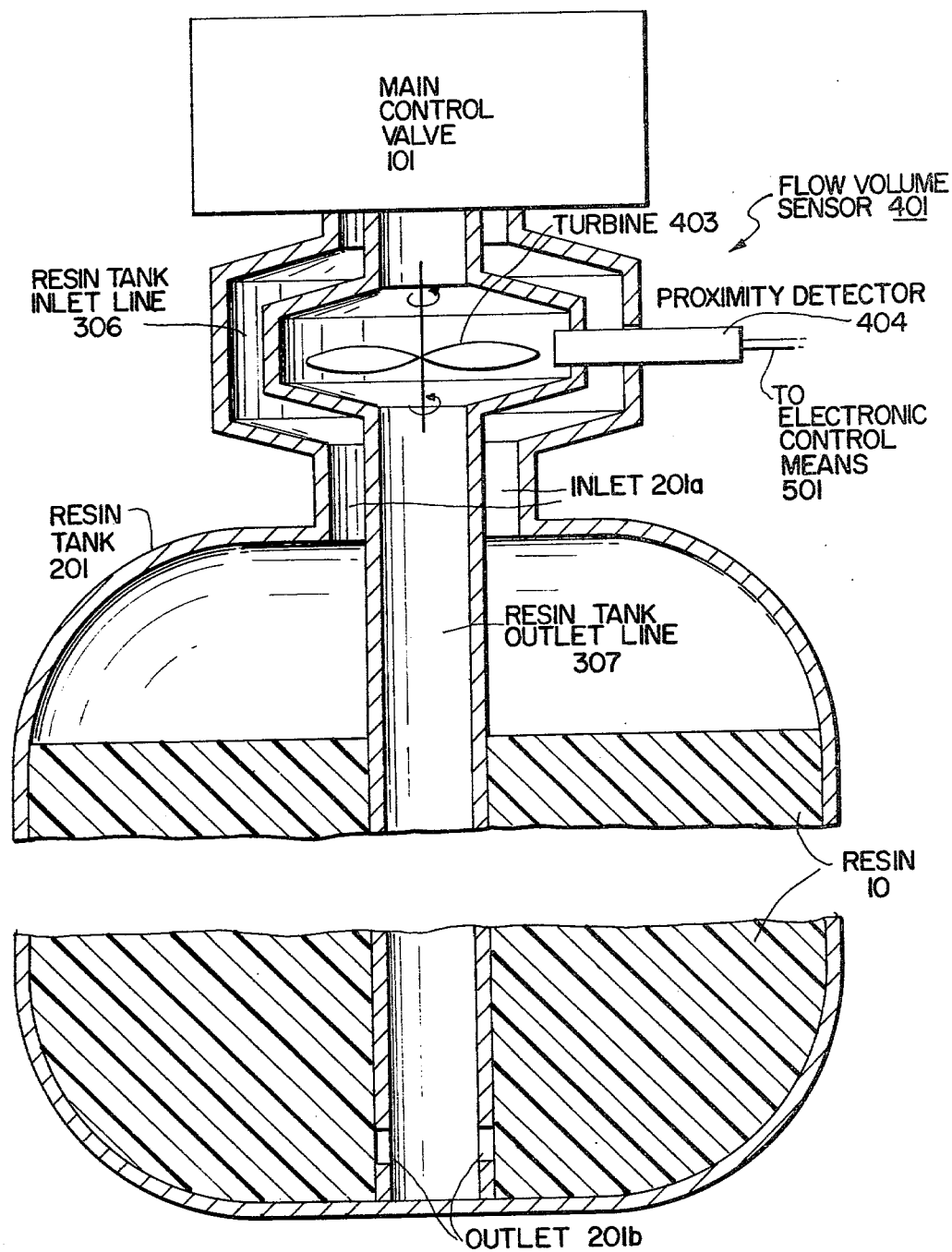
FIG. 3 illustrates one embodiment of a practical structure of the flow volume sensor in combination with the resin tank, the resin tank inlet and outlet lines and the main control valve.

FIG. 3 illustrates one embodiment of a unitary compact structure forming the combination of resin tank 201, resin tank inlet line 306, resin tank outlet line 307, main control valve 101 and flow volume sensor 401 illustrated in FIG. 1. Note that FIG. 3 clearly illustrates that resin tank outlet line 307 is coaxially disposed within resin tank inlet line 306. Further it is clearly seen that the flow volume sensor 401 is disposed between main control valve 101 and resin tank 201 in a manner which forms a single compact structure. During the ordinary operation of the water softening apparatus water flows from main control valve 101 down resin tank inlet line 306 through inlet 201a into resin tank 201, where the objectionable ions are exchanged for less objectionable ions, through outlet 201b into resin tank outlet line 307 and hence past the turbine 403 in resin tank outlet line 307 and returns to main control valve 101. The turbine 403 is disposed within the flow path of water through resin tank outlet line 307, and the passage of water through resin tank outlet line 307 causes this turbine 403 to turn. Each rotation of the turbine 403 corresponds to a predetermined amount of water flowing past this structure. The flow volume sensor 401 also includes a magnetic proximity detector 404 disposed in a position to sense the passage of the blades of the turbine 403. This magnetic proximity detector 404 detects the passage of each blade of the turbine 403 past a fixed position. Because each turn of the turbine 403 corresponds to a predetermined volume of water flowing past this point, the magnetic proximity detector 404 produces a pulse each time a predetermined amount of water passes flow volume sensor 401. Thus, the magnetic proximity detector 404 produces an electrical signal each time a predetermined amount of water passes through the resin tank. As noted in FIG. 3, this electrical signal is coupled to the electronic control means 501. Note that turbine 403 must be able to rotate in either direction in order to be able to measure the total fluid volume passing through the resin tank in either the forward direction or the reverse direction. Because each passage of each blade of turbine 403 past magnetic proximity detector 404 corresponds to the same volume of fluid passing turbine 403 regardless of the direction of flow, now special provision is necessary for providing the proper signal from magnetic proximity detector 404 upon reversal of the flow direction.

Figure 4:
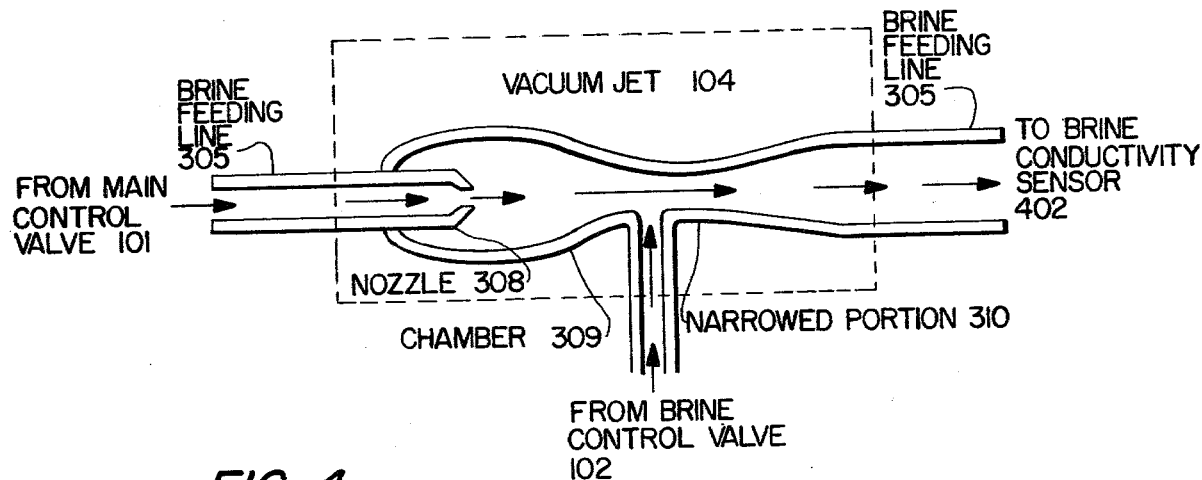
FIG. 4 illustrates one embodiment of the vacuum jet of the present invention.

One embodiment of the vacuum jet 104 employed in the apparatus shown in FIG. 1 is illustrated in FIG. 4. Water from brine feed line 305 is applied to a restricted nozzle 308 and flows into a chamber 309, through a narrowed portion 310 and hence back to brine feed line 305 and to main control valve 101. The line from brine tank 202 enters this structure near narrowed portion 310. According to well known principles of fluid mechanics the main flow through narrowed portion 310 is speeded up and the pressure is reduced causing a concentrated brine solution to be drawn from the line coupled to brine tank 202 via brine control valve 102, and hence through brine conductivity sensor 402 and into brine feed line 305 to be applied to the resin tank 201.

Figure 5:
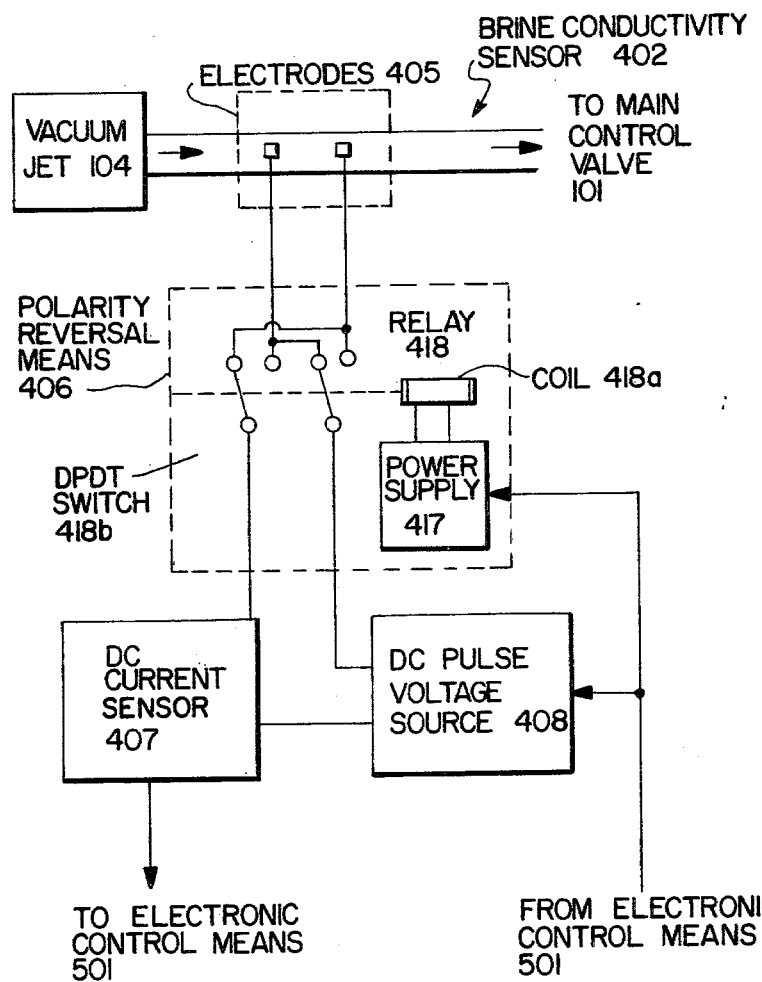
FIG. 5 illustrates one embodiment of the brine conductivity sensor of the present invention.

One embodiment of brine conductivity sensor 402 is illustrated in FIG. 5 and will be described in further detail below in conjunction with the description of the operation of water softening apparatus.

During the ordinary operation of the device, the flow through main control valve 101 is as illustrated in FIG. 2a; which shows water entering the device through hard water inlet 301 and passing through main control valve 101 to resin tank inlet line 306. From here the water passes through resin tank inlet 201a, resin tank 201 where the objectionable ions are exchanged in the ion exchange resin 10 for less objectionable ions, resin tank outlet 201b and resin tank outlet line 307. Resin tank outlet 201b is coupled to flow volume sensor 401 which measures the volume of water flow and hence to main control valve 101 where the water is directed to outlet 302. Thus, in the ordinary operating state of the device, hard water from hard water inlet 301 passes through resin tank 201 in the forward direction and is coupled out of the device by way of outlet 302. It is to be understood that flow of the water through resin tank 201 may be according to either the downflow principle or the upflow principle, both of which are known in the art and which are thus not further described or illustrated in detail.

Figure 2C:
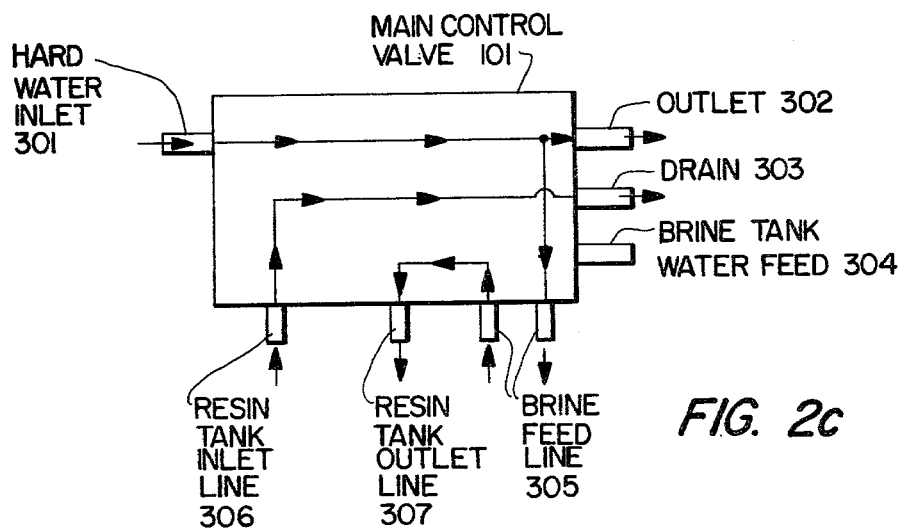
Figure 2D:
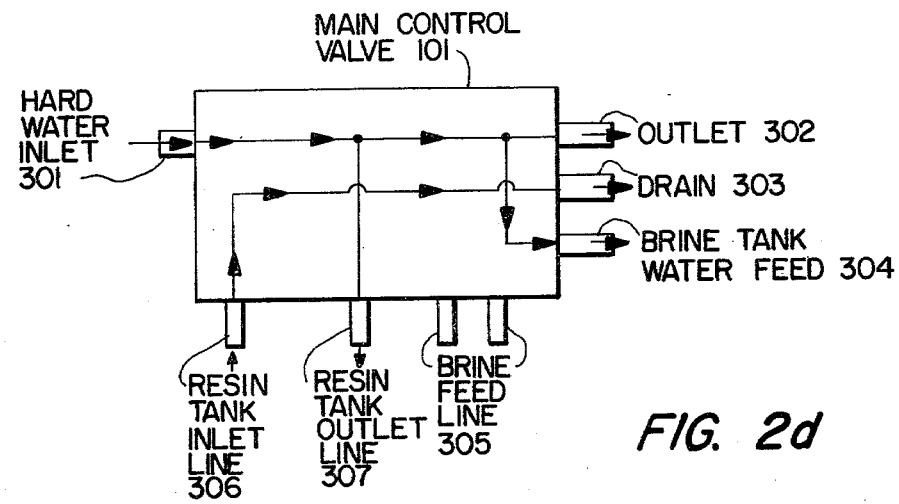

The regeneration of the resin tank 201 is accomplished in several steps. The first step in the regeneration process is a backwash or back flushing of the resin in resin tank 201. The second step in regeneration is application of brine from brine tank 202 to the resin in resin tank 201. Next the resin tank 201 is given a low pressure or low flow rate rinse. This step is followed by a step involving a high pressure or high flow rate rinse coupled with application of water to the brine tank 202. The final step involves the application of a sterilization agent to resin tank 201. As illustrated in FIG. 1 this sterilization agent may be obtained from sterilization tank 203 and controlled by sterilization agent control valve 103. The state of main control valve 101 during these regeneration steps is illustrated in FIGS. 2b through 2d.

During the backwash or back flush process, the main control valve 101 is coupled as illustrated schematically in FIG. 2b. Hard water inlet 301 is coupled directly to 302 through a bypass coupling. This bypass coupling is made so that water is available at the outlet of the water softening apparatus, even though unprocessed, during the regeneration process of the resin. Depending upon the application to which the resin-type ion exchange type is applied, it may be desirable to interrupt the fluid flow to outlet 302 during the regeneration process in order to prevent unprocessed fluid from leaving the ion exchange device. In addition, hard water from hard water inlet 301 is applied to resin tank outlet line 307. This water flows into resin tank 201 through outlet 201b and exits resin tank 201 through inlet 201a. This water is coupled by resin tank inlet line 306 and main control valve 101 to drain 303. In this state, hard water from hard water inlet 301 is passed through resin tank 201 in a reverse direction from the ordinary flow. This reverse flow serves to dislodge particulate matter trapped within resin tank 201 and flush it out of the system via drain 303. It is understood that drain 303 is to be coupled to a waste water inlet such as a sewer line. Thus, the particulate matter trapped in the resin tank 201 during the ordinary operation of the water softening device is flushed out of resin tank 201 and discarded.

The next step in the regeneration process is the application of brine from brine tank 202 to resin tank 201. Brine tank 202 is filled with the regeneration agent necessary to reverse the ion exchange process of the resin in resin tank 201, i.e. sodium ions. According to the technique usually employed in water softening devices of this type, brine tank 201 contains the regeneration agent partially covered with water. This technique insures that a highly concentrated solution of the brine and water is available for application to the resin in resin tank 201. FIG. 2c illustrates the flow through main control valve 101 during the brining step of the regeneration process. As explained above, hard water enters the device from hard water inlet 301 and is coupled to outlet 302 through a bypass pipe. As explained above, depending upon the particular application for the softened water, this bypass may be omitted so that no water exits the device through outlet 302. In addition, the hard water inlet 301 is connected to brine feed line 305. As illustrated in FIG. 1, brine feed line 305 is coupled to vacuum jet 104 and then has its opposite end also connected to main control valve 101. The flow of water from brine feed line 305 through vacuum jet 104 creates a vacuum which tends to draw the saturated brine solution from brine tank 202 through brine control valve 102. The means for controlling brine control valve 102 will be described below, however, the brine control valve 102 is always open during the brining step of the regeneration process. Thus, during the brining step saturated brine solution is mixed with the hard water in vacuum jet 104 to produce a diluted brine solution. As illustrated schematically in FIG. 2c, this diluted brine solution is passed through main control valve 101 and coupled to the resin tank outlet line 307. The thus prepared dilute brine solution passes through resin tank 201 in a reverse flow manner and is withdrawn through resin tank inlet 201a and resin tank inlet line 306. From here it passes through main control valve 101 and hence to drain 303 where it is discarded.

The operation of the brine conductivity sensor 402 will now be described in conjunction with FIG. 5. In a water softening apparatus such as illustrated in FIG. 1 the regeneration agent most commonly employed is sodium chloride. Ordinarily brine tank 202 is filled with sodium chloride and partially filled with water. The brine solution is withdrawn from the bottom of the brine tank and therefore a saturated brine solution is assured whenever sufficient sodium chloride is stored in brine tank 202. Naturally, when the regeneration agent is depleted, it must be resupplied in order to enable continued regeneration of the resin in resin tank 201. Since experience has shown that the great majority of service calls for water softening apparatuses are caused by depletion of the supply of the regeneration agent, the present invention includes a means for detecting when this regeneration agent is depleted. FIG. 1 illustrates brine conductivity sensor 402 appearing in the line between vacuum jet 104 and main control valve 101. As illustrated in FIG. 5 brine conductivity sensor 402 comprises a pair of electrodes 405 which are employed to measure the conductivity of the diluted brine solution which is applied to resin tank 201 as the regeneration agent. Experience has shown that a minimum value of brine concentration of 120 grams of sodium chloride per liter is required in order to achieve good regeneration of the resin in resin tank 201. This concentration of sodium chloride required is translated into a resistivity or conductivity which is measured by applying a predetermined voltage to the electrodes 405 and measuring the current passing therethrough.

The electrodes 405 of brine conductivity sensor 402 are placed in a highly corrosive environment. Therefore, it is highly desirable that these electrodes be made of a noncorroding material or at least coated with a noncorroding material such as gold. In addition, the electrical measurement can be performed in a manner illustrated in FIG. 5 which reduces the corrosion and/or electrolytic erosion of these electrodes. As clearly illustrated in FIG. 5, the dc voltage polarity applied to electrodes 405 for the conductivity measurement can be reversed through polarity reversal means 406 which is illustrated in this embodiment as including double pole double throw switch 418b. It is preferable that the polarity of the dc voltage applied to electrodes 405 be reversed between each conductivity measurement in order to prevent polarization of electrodes 405. It is also preferred that the conductivity measurement be performed in an intermittent manner with a low duty cycle. That is, current should be applied to electrodes 405 for only a short period at widely spaced intervals. In addition, these measurements need only be taken during the brining process because the brine solution concentration is not expected to change except when brine solution is withdrawn from brine tank 202 during the brining process.

The apparatus illustrated in FIG. 5 expeditiously accomplishes the above-named objects of the brine conductivity sensor 402. Upon placing the apparatus in condition for the brining step by placing main control valve 101 in the state illustrated in FIG. 2c and by opening brine control valve 102, electronic control means 501 controls the operation of brine conductivity sensor 402. Firstly, electronic control means 501 applies a signal to polarity reversal means 406 for causing the polarity of the signal applied to electrodes 405 to be reversed. This is accomplished by selective actuation of power supply 417 in order to change the state of relay 418. Application of power from power supply 417 to coil 418a when coil 418a is not powered or interruption of power from power supply 417 to coil 418a when coil 418a is powered serves to change the state of double pole double throw switch 418b thereby reversing the polarity of the voltage applied to electrodes 405. It is to be understood that polarity reversal means 406 is not limited to the combination of power supply 417 and relay 418 illustrated but may be composed of other type controllable switching elements such as transistors. As explained above this reversal of polarity serves to prevent long term polarization of the electrodes. Next, electronic control means 501 actuates DC pulse voltage source 408 which produces a short DC pulse having a predetermined voltage. This DC pulse is applied to electrodes 405 through polarity reversal means 406 and also flows through DC current sensor 407. DC current sensor 407 produces a signal indicative of the current flowing through electrodes 405 which is processed in electronic control means 501 in order to determine whether the concentration of the brine solution between electrodes 405 is great enough to enable proper regeneration of the resin in resin tank 201. If the brine concentration level is insufficient, electronic control means 501 actuates an alarm/service alert means 502 (FIG. 1) in a manner more fully detailed below. Electronic control means 501 repeats the above listed measuring steps at intervals during the brining step of the resin regeneration process, which intervals may be determined by time or by the total fluid volume passing flow volume sensor 401. The Applicant has employed a brine conductivity sensor such as described above which has a measurement duty cycle as low as 0.001 sec. voltage pulse per minute during the brining step. As stated above, this measurement process is actuated by electronic control means only during the brining step of the regeneration process.

FIG. 1 illustrates one embodiment for the control of the opening and closing of brine valve 102. As illustrated in FIG. 1, brine control valve 102 is opened by a signal from electronic control means 501. This signal is produced by electronic control means 501 in conjunction with a signal applied to main control valve 101 to place it in the proper state for the brining step. Brine control valve 102 is also closed by a signal from electronic control means 501. At that time, the brine solution is no longer drawn into resin tank 201 via vacuum jet 104. However, hard water from hard water inlet 301 is still applied to brine feed line 305 and enters resin tank 201 through vacuum jet 104. This water flow through resin tank 201 corresponds to the low flow rate rinse step of the regeneration process. Main control valve 101 remains in the same state as during the brining step, therefore, the rinse water exits resin tank 201 through inlet 201a and is coupled to drain 303 through resin tank inlet line 306 and main control valve 101. This flow of water serves to rinse the resin tank 201 and remove soluble matter. Brine control valve 102 is controlled solely by electronic control means 501. Brine control valve 102 is opened in conjunction with the start of the brining step and the placing of main control valve 101 into the state illustrated in FIG. 2c. Electronic control means 501 keeps brine control valve 102 opened for a period sufficient to enable a predetermined volume of brine solution to pass through the resin tank 201 as measured by flow volume sensor 401. This predetermined volume is determined by the volume of resin in resin tank 201 and the chemical efficiency of the brine for regeneration of the resin in resin tank 201.

The next step in the regeneration process is the high flow rate rinse step. The coupling of main control valve 101 during the high flow rate rinsing step is illustrated schematically in FIG. 2d. As described above, the bypass from hard water inlet 301 to outlet 302 may be omitted depending upon the application to which the water is applied. As illustrated in FIG. 2d, main control valve 101 couples water from hard water inlet 301 to resin tank outlet line 307. This water flows through resin tank 201 from outlet 201b to inlet 201a and is returned to main control valve 101 through resin tank inlet line 306. As illustrated in FIG. 2d, main control valve 101 couples resin tank inlet line 306 to drain 303 where the water is discarded.

Also illustrated in FIG. 2d is a connection between hard water inlet 301 and brine tank water feed 304. This connection couples hard water from main control valve 101 into brine tank 202. This water falls to the bottom of brine tank 202 serving to resupply the water removed from brine tank 202 during the previous brining step. Thus, a concentrated brine solution is produced at the bottom of brine tank 202 for application to resin tank 201 during the next brining step. It is understood by those skilled in the art that this feed of water to brine tank 202 need not occur during the high flow rate rinse step but may occur at any convenient time after the brining step.

The final step in the regeneration process is application of a sterilization agent to resin tank 201. This sterilization agent serves to control the growth of bacteria or algae which may otherwise grow in resin tank 201. As illustrated in FIG. 1, sterilization agent tank 203 is coupled to resin tank 201 through sterilization agent control valve 103. Sterilization agent control valve 103 is controlled from electronic control means 501 to apply to a predetermined amount of sterilization agent to the resin tank 201. Though FIG. 1 illustrates a gravity feed from sterilization agent tank 203 to resin tank 201, those skilled in the art would recognize that any other convenient means may be employed for the application of the sterilization agent such as a separate pump or an additional vacuum jet such as vacuum jet 104.

Those skilled in the art will understand that brine control valve 102 and sterilization agent control valve 103 may be of any convenient type such as solenoid actuated valves or a servo-mechanism valves.

Now the operation of electronic control means 501 will be described in conjunction with FIG. 6. The central feature of electronic control means 501 is microprocessor 503 which may be of any convenient type such as Texas Instruments TMF-1070. Microprocessor 503 is mutually coupled to memory 505 which serves to store the operational program of microprocessor 503, the programmed predetermined data and the intermediate values of calculations performed by microprocessor 503. The predetermined values necessary for the operation of the electronic control means are either permanently stored in memory 505 or entered into microprocessor 503 through programming means 504. Programming means 504 may take any convenient form such as a plurality of programming switches. It is preferred, however, that programming means 504 take the form of a counting programming means in conjunction with display 507. In this embodiment programming means 504 includes a start control and a stop control. Actuation of the start control in programming means 504 enables a counter in microprocessor 503 to be periodically incremented via an oscillator. The count of this counter is displayed on display 507. When the predetermined value desired is displayed on display 507, the stop control is actuated and the number now stored in the counter portion of the microprocessor is applied to an appropriate portion of memory 505. The particular predetermined value thus determined by programming means 504 may be selected by a selection switch or selection switches incorporated into programming means 504 or the predetermined values may always be entered into the same order, which order is specified in the predetermined value loading program stored in memory 505. Each of the above identified embodiments of programming means 504 are known in the art and further description thereof is omitted for the sake of brevity. Display 507 may also be employed to display previously stored predetermined constants or operational variables of microprocessor 503. The output of microprocessor 503 is applied to output buffer 508. Output buffer 508 translates the signal output from microprocessor 503 into the actual electrical signals necessary to operate the valves. Microprocessor 503 also receives inputs from input buffer 506. As described in further detail below input buffer 506 serves to translate data from various measuring devices in the water softening apparatus of this embodiment into signals readable by microprocessor 503. Microprocessor 503 may have a clock means 509 incorporated therein such as possible with the use of the above cited microprocessor Texas Instruments TMF-1070. Clock means 509 is advantageously employed for measuring the length of time of various volume controlled regeneration steps in conjunction with the actuation of alarm/service alert means 502. This function of clock means 409 is explained in detail in conjunction with the description of the operation of alarm/service alert means 502 appearing below.

Figure 6:
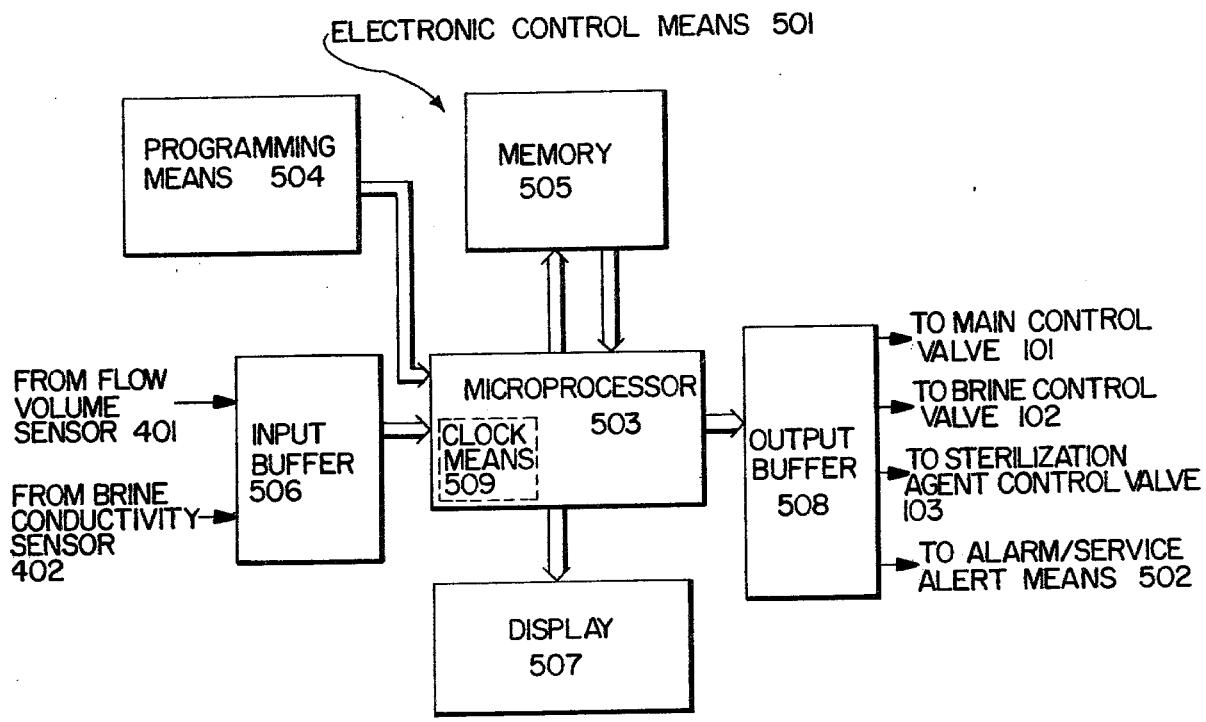
FIG. 6 is a block diagram of the electronic control means illustrated in FIG. 1.

The microprocessor control system illustrated in FIG. 6 is typical of the conventional type of circuit used in systems of this type. The structure and function of these microprocessor control systems are well understood by those skilled in the art. It is understood that one skilled in the art of microprocessor control systems, would be capable of making the design choices necessary to adapt the system illustrated in FIG. 6 to the particular application desired.

The electronic control means of the present invention will now be described in conjunction with a volume base regeneration control system. A predetermined flow volume between regeneration cycles is entered into memory 505 by means of programming means 504. As discussed above, this programming entry is preferably performed by means of enabling a counter in microprocessor 503 to be incremented repeatedly while the number stored in this counter is displayed on display 507. When the number displayed on display 507 corresponds to the predetermined flow volume between regeneration cycles, this number is entered into memory 505.

When the microprocessor 503 determines that it is time to initiate a regeneration cycle, a preprogrammed sequence stored in memory 505 is started. First, main control valve 101 is changed to the state illustrated in FIG. 2b to perform the backwashing step of the regeneration cycle. The length of time in which main control valve 101 remains in this state, that is the total time for the backwash cycle, is based upon a predetermined constant volume of backwash flow whose value may be permanently stored in memory 505 or may be entered by means of programming means 504 depending upon the particular application of the water softener illustrated in FIG. 1. When this backwash volume has passed, microprocessor 503 commands main control valve 101 to assume the state illustrated in FIG. 2c. The total flow volume of the brining and low flow rate rinse is a predetermined constant which is permanently stored in memory 505 or set by means of programming means 504. In the embodiment illustrated in FIG. 1, brine control valve 102 is opened in response to command from microprocessor 503 at the beginning of the brining step. This valve is closed when a predetermined constant volume of brine solution has passed through resin tank 201 as measured by flow volume sensor 401.

Microprocessor 503 determines when the predetermined constant volume of brine solution (whose value is stored in memory 505) passes through flow volume sensor 401. Upon making such a determination, microprocessor 503 closes brine control valve 102 via a signal coupled through output buffer 508. Since the amount of brine to be applied to resin tank 201 depends upon the known concentration of brine solution and the known chemical efficiency for regeneration of the particular brine employed and upon the known volume of resin to be regenerated, this predetermined constant volume is preferable permanently stored in memory 505.

Main control valve 101 remains in the state illustrated in FIG. 2c until the end of the slow flow rate rinse step. When microprocessor 503 determines that the predetermined constant volume for the brining and slow flow rinse step has passed, it sends a signal to main control valve 101 through output buffer 508 to place it in the state illustrated in FIG. 2d. Thereupon the step of the high flow rate rinse is performed. According to the present embodiment, at the same time, hard water is coupled from hard water inlet 301 to brine tank water feed 304 to replace the water removed from brine tank 202 during the brining step.

When a predetermined volume for the high flow rate rinse step, either permanently stored in memory 505 or stored therein by means of programming means 504, has passed through resin tank 201, microprocessor 503 stops the high flow rate rinse step. Thereupon, microprocessor 503 sends a signal to main control valve 101 by way of output buffer 508 to place main control valve 101 into the state illustrated in 2a. At this time micrprocessor 503 applies a signal to sterilization agent control valve 103 via output buffer 508 to open the valve 103, thus enabling application of the sterilization agent stored in sterilization agent tank 203 to resin tank 201. After application of a predetermined amount of the sterilization agent, microprocessor 503 closes sterilization agent control valve 103. Thus, the resin in resin tank 201 has been regenerated and the normal operation of the water softening device is restored.

The water softener illustrated in FIG. 1 has a fixed volume of ion exchange resin in resin tank 201. In ordinary applications, the hardness of the water entering hard water inlet 301 does not vary greatly. Since the ion exchange resin has a fixed capacity for ion exchanging and the ion concentration of the water is relatively constant, the ion exchange resin is exhausted after processing a relatively fixed volume of water. That is, regardless of the time required, the ion exchange resin is exhausted when a fixed amount of water is processed. Thus, the apparatus of this embodiment is equipped with flow volume sensor 401 such as illustrated in FIG. 3.

Flow volume sensor 401 serves to measure the total hard water passing through resin tank 201 through resin tank outlet line 307. Flow volume sensor 401 may comprise any suitable means for converting the flow of water into an electrical signal such as a turbine connected to a small electrical generator or a turbine having blades whose passage is detected by a magnetic proximity detector such as described in conjunction with FIG. 3. This signal indicative of the amount of water flowing through the water softening device is applied to electronic control means 501 by way of input buffer 506. Microprocessor 503 integrates the total water flow through flow volume sensor 401 and compares this with a preset volume stored in memory 505. This preset volume is determined in relation to the volume and capacity of the ion exchange resin and the expected hardness of the water applied to hard water inlet 301. When microprocessor 503 determines that the predetermined amount of water has flowed through flow volume sensor 401, the regeneration cycle sequence is initiated as described above. The initiation of the regeneration cycle is based upon the total water passing through the resin tank of the water softener. By this means, the electronic control means 501 automatically takes into account times of high water flow rate and low water flow rate and initiates the regeneration cycle at the same exhaustion state of the ion exchange resin. Thus, regeneration takes place only when required, thereby preventing excessive water and energy usage through unnecessary regeneration and also preventing deterioration in the quality of the water supplied through exhaustion of the ion exchange resin.

The length of each step of the regeneration sequence is determined in a manner similar to the manner to which the length of time between regeneration cycles is determined. That is, microprocessor 503 integrates the total volume of fluid passing through flow volume meter 401 during each of the steps of the regeneration sequence and compares this total flow with respective predetermined constant volumes for each of the steps. This is advantageous for the following reasons. For example, according to the present invention, a predetermined volume of water flows through the resin tank 201 in a reverse direction during the backwashing step of the regeneration sequence. Therefore, if the resin in resin tank 201 is clogged or partially clogged by trapped particulate matter, thereby restricting the flow rate through the resin during the backwashing step, the microprocessor 503 automatically extends the period during which the resin is backwashed. Conversely, during a period in which the resin is not clogged with particulate matter the length of time for the backwash operation is correspondingly short, because the flow rate through the resin is relatively large. This volume base regeneration step control also takes into account fluctuations in the water pressure of the hard water inlet, and corresponding fluctuations in the flow rate. Therefore, this type of regeneration sequence control assures a fixed volume of water will flow during the backwashing step. Similarly, the volume based regeneration step type control assures that a predetermined value of brine solution is applied to resin tank 201 during the brining step and that respective predetermined volumes of water are applied during the low flow rate rinse step and during the high flow rate rinse step. Therefore, variations in the water pressure and in the porosity of the resin are automatically taken into account.

Figure 7A:
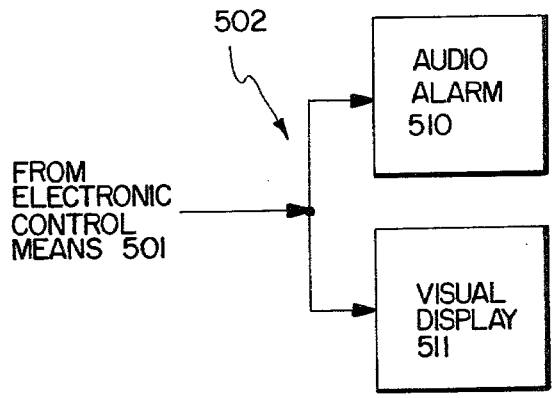
FIGS. 7a to 7c illustrate various embodiments of the alarm/service alert means of the present invention.

There will now be described the operation of the alarm/service alert means 502 in conjunction with the illustrations of FIGS. 7a to 7c. An alarm/service alert means is desirable in an ion exchange device such as the water softening apparatus illustrated in FIG. 1 for the following reasons. The typical home user of a water softening apparatus is ordinarily not aware of the function of the apparatus unless the apparatus develops some serious fault. Normally, the typical home user is not initially aware of a malfunction in a water softening apparatus. In addition, experience has shown that approximately 90% of the service calls from the typical home user of a water softening apparatus are caused by lack of salt, that is lack of the regeneration agent necessary to regenerate the resin in resin tank 201. This sort of service call which could be easily detected and easily solved by the customer, results in poor utilization of service personnel who could be better employed responding to real apparatus failures. For this reason the present invention includes brine conductivity sensor 402 and alarm/service alert means 502. As explained in detail above, the brine conductivity sensor 402 determines the concentration of the brine solution applied to the resin tank 201 during the brining step of the regeneration process. If this concentration is insufficient to enable proper regeneration of the resin electronic control means 501 then actuates alarm/service alert means 502. As illustrated in FIG. 7a, alarm/service alert means 502 could include audio alarm 510 and visual display 511. Because the typical home user of a water softening apparatus such as illustrated in FIG. 1 often has the apparatus disposed in a remote location of the house, the alarm/service alert means 502 consisting of audio alarm 510 and visual display 511 may be located separate from the main portion of the apparatus at locations where the alarm is more easily observed. Actuation of audio alarm 510 alerts the user who then observes visual display 511. Visual display 511 preferably provides some indication of the nature of the failure in the water softening apparatus. In the present example visual display 511 can indicate "salt" and upon observing this signal the user would know the apparatus requires resupply of its salt supply.

Use of the alarm/service alert means 502 is not limited to an indication of the depletion of the salt supply. Further apparatus failures can be detected in conjunction with clock means 509 included within microprocessor 503. As explained in detail above, microprocessor 503 controls the length of the steps of the regeneration process in accordance with the total volume of fluid passing through flow volume sensor 401 during each of these steps. Microprocessor 503 may also calculate the total length of time taken for each of these regeneration steps in conjunction with clock means 509. Microprocessor 503 would then compare the length of time required for each regeneration step with respective predetermined constant lengths stored in memory 505. These respective predetermined constant periods of time stored in memory 505 would correspond to the worst case for each of these regeneration steps. That is, stored in memory 505 would be the longest time reasonably expected for each of the regeneration steps during normal operation. In the event that the length of one of the regeneration steps which is controlled by the volume of flow through flow volume sensor 401 were longer than the corresponding predetermined period of time stored in memory 505, microprocessor 503 would actuate alarm/service alert means 502. In this case visual display 511 would indicate the portion of the regeneration sequence which exceeded its corresponding predetermined length of time allotted. Microprocessor 503 may be further programmed to suspend operation of the apparatus a predetermined time after the occurrence of such an event. This course would serve to protect the apparatus from further damage due to improper operation.

The alarm/service alert means of the present invention is not limited to indication of the above mentioned faults alone. In accordance with the explanations appearing below, the alarm/service alert means may also indicate the operation of an outlet conductivity sensor which is employed in conjunction with the discard valve to discard outlet water when it has a conductivity greater than a predetermined magnitude. Of course in this event, microprocessor 503 would actuate visual display 511 to indicate that the conductivity of the output water is greater than the predetermined standard.

Figure 7B:
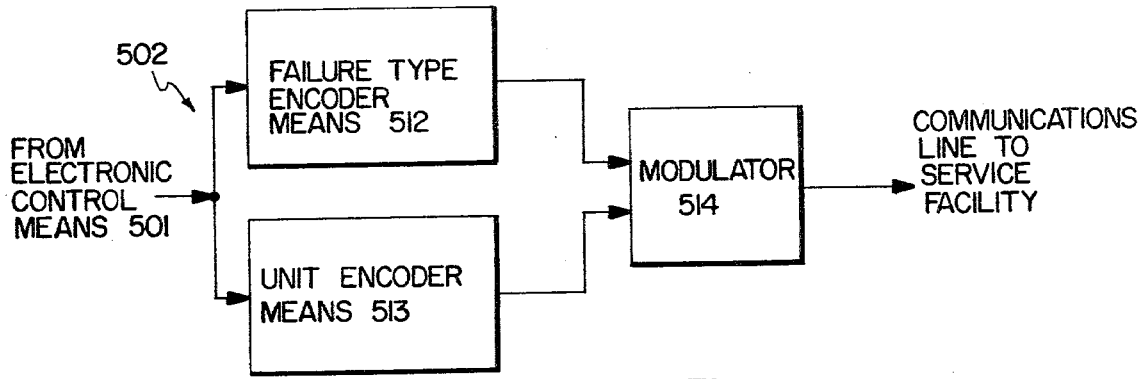
Figure 7C:
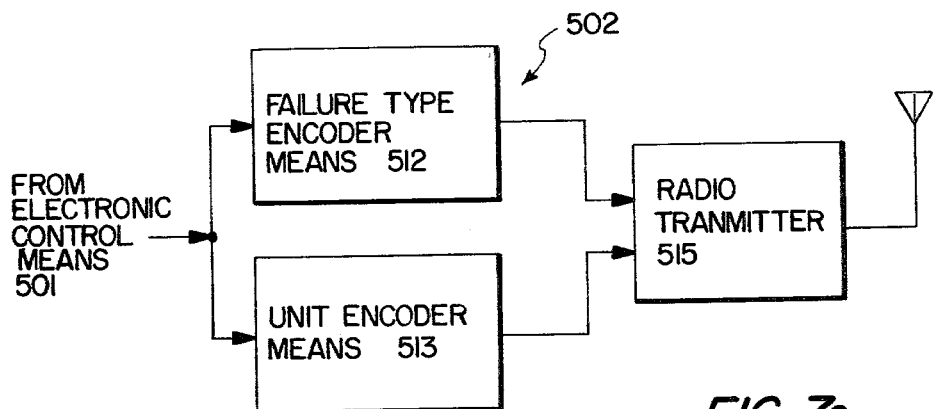

The alarm/service alert means may include further service alert components such as illustrated in FIGS. 7b and 7c. FIGS. 7b and 7c illustrate structure which may be employed instead of or in addition to the structure illustrated in FIG. 7a. FIGS. 7b and 7c both illustrate a failure type encoder means 512 and a unit encoder means 513 which are illustrated as actuated by electronic control means 501. Upon detection of a failure such as the failures described above, or a predetermined time thereafter, electronic control means 501 sends a signal to failure type encoder means 512 indicating the type of failure observed. Failure type encoder means 512 then translates this input into an encoded output which is indicative of the type of failure observed. At the same time, electronic control means 501 also actuates unit encoder means 513. Unit encoder means 513 produces an output which is indicative of that particular water softening apparatus. FIG. 7b illustrates that these two encoded signals are applied to modulator 514 and hence to a service facility via a communications line. This communications line may be a special line particularly provided for the purpose of sending this signal from the water softening apparatus to the service facility or it may be an ordinary telephone line. In the latter case modulator 514 must include some sort of dialing means or switching means in order to reach the telephone number of the service facility. This same sort of communications is illustrated in FIG. 7c, except that in FIG. 7c the outputs from failure type encoder means 512 and unit encoder means 513 are applied to a radio transmitter 515. The radio wave signal thus produced is received in the service facility.

Upon receipt of the communications illustrated in FIGS. 7b and 7c in the service facility, the information encoded in failure type encoder means 512 and unit encoder means 513 is decoded. Therefore, the service facility is provided with information of the particular water softening apparatus requiring servicing and further the particular failure mode of that water softening apparatus. With this information a service person can be dispatched to the location of that water softening apparatus with the tools and equipment necessary to diagnose and repair the failure noted. Thus, the alarm/service alert means can enable dispatch of the necessary service personnel and equipment even before the user is aware of the failure of the water softening apparatus.

The apparatus illustrated in FIG. 7a can be used in conjunction with either the apparatuses illustrated in FIGS. 7b or 7c in the manner detailed below. When electronic control means 501 first detects a failure or an abnormality in the operation of the water softening apparatus, the user may be allerted by a audio alarm 510 and visual display 511. Then, employing the output of clock means 509, microprocessor 503 may enable operation of the communication with the service facility if the failure is not corrected within a predetermined period of time. This period of time may be stored in memory 505.

Figure 8:
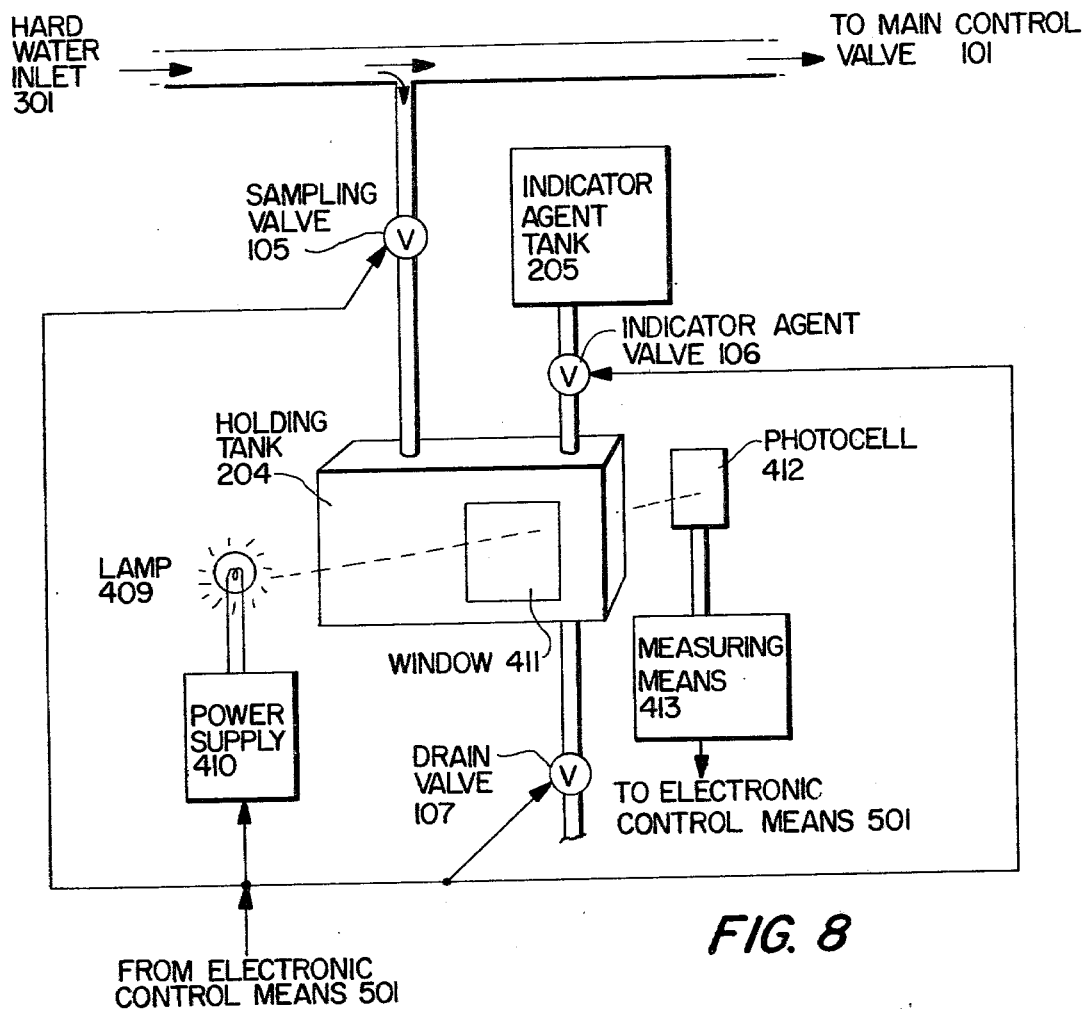
FIG. 8 illustrates a water hardness sensor which may be employed in the apparatus of the present invention.

FIG. 8 illustrates the structure and operation of a water hardness sensor which may be employed with the apparatus of the present invention. The water hardness sensor of FIG. 8 is similar in structure to the sensors of the Automat (TM) series manufactured by the French corporation Degremont. The apparatus illustrated in FIG. 8 makes a direct measurement of the hardness of the inlet water supplied to the water softening apparatus and produces an electric signal indicative of this hardness. This electric signal is applied to microprocessor 503 by a input buffer 506. Because the depletion of the resin in resin tank 201 depends upon the number of unwanted ions passing through resin tank 201, measurement of the hardness of the water entering the water softening apparatus coupled with measuring the volume of water passing through the apparatus using flow volume sensor 401, enables exact calculation of the depletion state of the resin in resin tank 201. In ordinary operations the hardness of the water supplied to a water softening apparatus does not vary greatly and therefore such a water hardness sensor is not required for a moderately accurate calculation of the depletion state of the resin in resin tank 201. However, in situations in which the hardness of the inlet water is expected to vary over a considerable range, it may be necessary to measure the hardness of the water supply to the water softening apparatus in order to achieve an accurate determination of the exhaustion state of the resin in resin tank 201.

The operation of the water hardness sensor is controlled by electronic control means 501 in the manner detailed below. Firstly, sampling valve 105 is momentarily opened, thus enabling water from hard water inlet 301 to flow into holding tank 204. Once this sample has been taken electronic control means commands sampling valve 105 to close. Next, an indicator agent is applied to holding tank 204 from indicator agent tank 205 by opening the indicator agent valve 106. After a predetermined amount of the indicator agent is added to holding tank 204, electronic control means 501 closes indicator agent valve 106. The indicator agent from indicator agent tank 205 combines with a substance in the hard water in holding tank 204 in a manner well known in the art to produce a transparent liquid whose optical density is dependent upon the concentration of the substance in the water. In general a different indicator element is required for different objectionable substances appearing in the hard water, however, in most instances only a single objectionable substance is the most prevalent and therefore only a single indicator agent is required. Next, electronic control means 501 actuates power supply 410 which powers lamp 409. Light from lamp 409 shines through window 411 in holding tank 204, through the marked hard water therein and falls upon photocell 412. Because the optical density of the water within the holding tank 204 is dependent upon the concentration of the objectionable substance therein, the amount of light received by photocell 412 is indicative of the concentration of the objectionable substance in the hard water inlet 301. It is understood that the optical system including lamp 409 and photocell 412 may include one or more lenses or mirrors for directing the light from lamp 409 to photocell 412. Measuring means 413 is coupled to photo cell 412 and produces an output indicative of the light falling on photocell 412. This output is coupled to electronic control means 501. Thus, electronic control means 501 receives an electrical signal indicative of the hardness of the water applied to the water softening apparatus by a hard water inlet 301. After the measurement of the water hardness has taken place, electronic control means 501 opens drain valve 107 in order to drain the holding tank 204 in order to prepare for the next measurement. These measurements are taken at predetermined intervals determined by electronic control means 501. In some applications in which the water hardness is expected to vary only slowly, elctronic control means 501 will initiate this water hardness measurement with a low frequency. In other applications in which the hardness of the water supplied to the water softening apparatus is expected to vary greatly within a short length of time, electronic control means 501 actuates the water hardness sensor with a greater frequency.

The hardness of the water at the inlet to the water softening apparatus measured by the water hardness sensor is applied to electronic control means 501 as indicated above. This input, together with the volume of water flowing past flow volume sensor 401, is sufficient to enable electronic control means 501 to calculate the number of objectionable ions which have passed through resin tank 201 since the previous regeneration. Thus, employing the known capacity of the resin in the resin tank 201, it is possible to produce an accurate measure of the depletion state of the resin within resin tank 201. When this depletion state reaches a predetermined level stored in memory 505, electronic control means 501 initiates a regeneration cycle.

Figure 9:
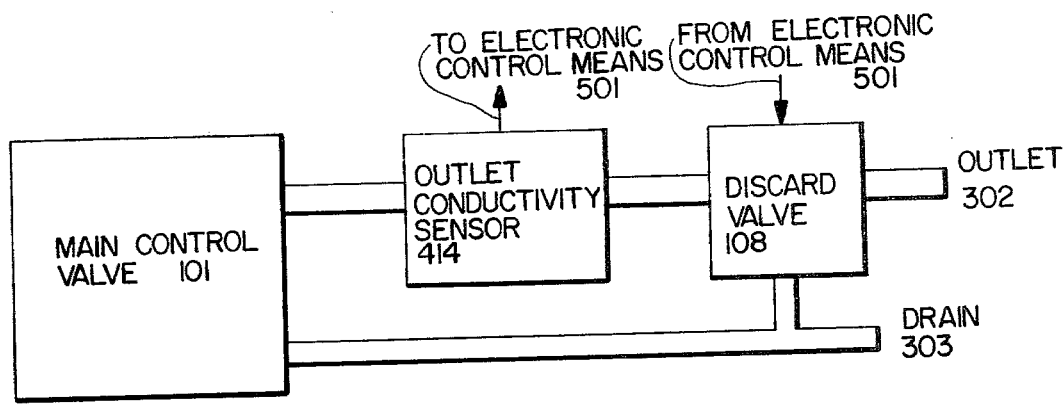
FIG. 9 illustrates a first embodiment of the combination of an outlet conductivity sensor and discard valve which may be employed with the apparatus of the present invention.

FIG. 9 illustrates the combination of an outlet conductivity sensor 414 and a discard valve 108 which may be used in conjunction with the present invention. This combination of outlet conductivity sensor 414 and discard valve 108 serve as a backup system to ensure that the output water supplied to outlet 302 by the water softening apparatus has a predetermined minimum quality. This combination of outlet conductivity sensor 414 and discard valve 108 should only be used in combination with an embodiment of main control valve 101 which does not permit a bypass flow during the regeneration cycle.

In addition to the backup function of this combination, the outlet conductivity sensor 414 and the discard valve 108 serve to prevent supply of poor quality water to outlet 302 upon initial start up of the apparatus or after a period of nonuse. As well understood by those skilled in the art of ion exchange resin apparatuses, the exchange of objectionable ions in the hard water for the less objectionable ion in the resin is a reversable process. Thus, the less objectionable ions in the hard water are exchanged for the objectionable ions in the resin simultaneously with the desired exchange noted above. The rates of these two reactions is dependent upon the relative concentration of the ions in the hard water and the resin. During the ordinary operation of an ion exchange apparatus the reverse exchange process takes place at a low reaction rate due to the relative concentrations of the ions. In the water softening apparatus illustrated in FIG. 1 the objectionable ions are constantly supplied to resin tank 201 by a resin tank inlet line 306. Simultaneously, water having the objectionable ions exchanged for the less objectionable ions is constantly being removed from resin tank 201 by a resin tank outlet line 307. Thus, because the concentration of the objectionable ions in the hard water is high and the concentration of the less objectionable ions in the resin is also high, the exchange of these ions takes place at a relatively rapid rate. On the contrary, because the concentration of the less objectionable ions in the hard water is low and because the concentration of the objectionable ions in the resin is also low, this reaction takes place at a much slower rate. This situation is altered when water does not flow through resin tank 201. In such a case the concentration of the less objectionable ions in the hard water in resin tank 201 and the concentration of the objectionable ions in the resin in resin tank 201 are both allowed to increase. This change in ion concentration decreases the rate of exchange of the objectionable ions in the hard water and the less objectionable ions in the resin and also increases the rate of exchange of the less objectionable ions in the hard water with the objectionable ions in the resin. Eventually this process changes the relative ion concentration until a balance is reached between the two rates of exchange. Thereafter, the relative ion concentrations do not change. Because of this shift in the ion concentrations during a period in which water is not flowing through resin tanks 201, upon initial start up after this nonflow period the concentration of the objectionable ions in the water leaving resin tank 201 is greater than during periods of steady state flow through resin tank 201.

Outlet conductivity sensor 414 may be of the same nature as the brine conductivity sensor 402 illustrated in FIG. 5. Outlet conductivity sensor 414 measures the conductivity of the outlet water and sends a signal to electronic control means 501 indicative of the quality of the water produced by the water softening apparatus. If this water quality is greater than a predetermined level, electronic control means 501 places discard valve 108 in a state to couple the water supply to it from outlet conductivity sensor 414 to outlet 302. If the measured water quality is less than this predetermined level, electronic control means 501 switches discard valve 108 so that the water supplied thereto is coupled to drain 303 and thus discarded.

Figure 10:
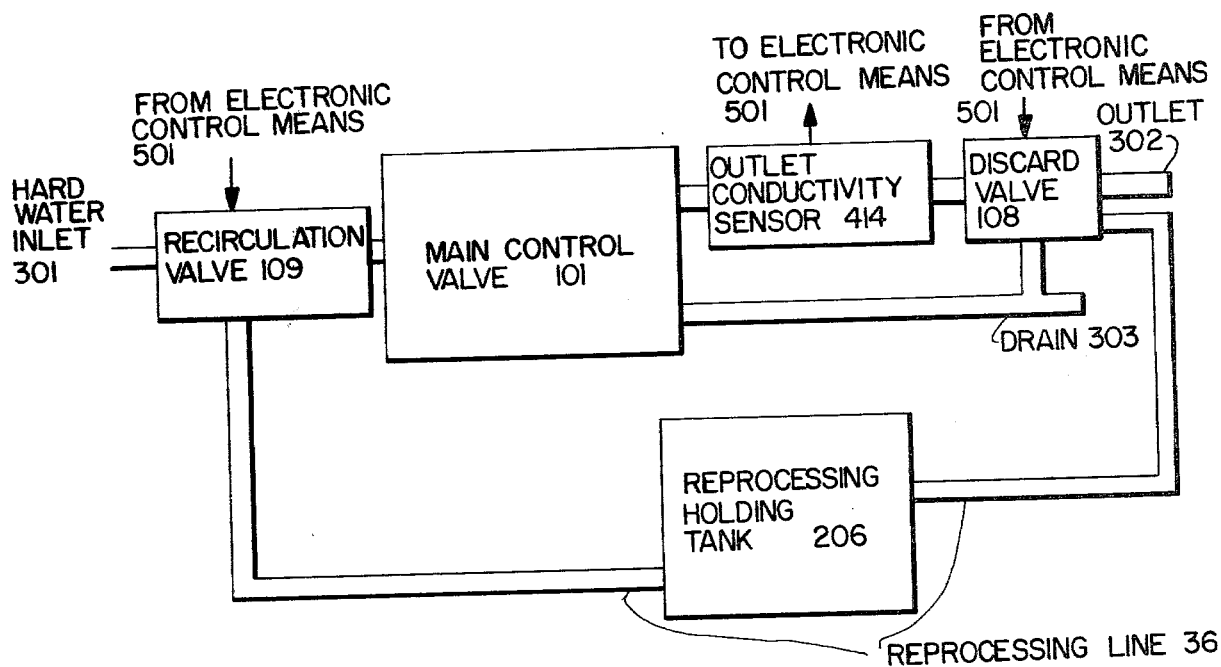
FIG. 10 illustrates a second embodiment of the combination of an outlet conductivity sensor and discard valve which may be employed with the apparatus of the present invention.

A further embodiment employing the combination of outlet conductivity sensor 414 and discard valve 108 is illustrated in FIG. 10. In this case the water quality is separated into three quality levels. If the water quality as measured by outlet conductivity sensor 414 is greater than a first predetermined level, electronic control means 501 places discard valve 108 into a state to couple the water supply to it to outlet 302. If the measured water quality is less than the first predetermined level but greater than a second predetermined level, electronic control means 501 places discard valve 108 into a state in which the water supplied to it is coupled to reprocessing line 311 and stored in reprocessing holding tank 206. If the water quality is less than the second predetermined level, electronic control means 501 places discard valve 108 into a state such that the water supplied to valve 108 is coupled to drain 303. This embodiment further includes recirculation valve 109. At an appropriate time after the intermediate quality water is stored in reprocessing holding tank 206, recirculation valve 109 may be switched to apply water from reprocessing holding tank 206 to main control valve 101 in place of or in addition to water from hard water inlet 301.

Electronic control means 501 may be programmed to actuate alarm/service alert means 502 in conjunction with the operation of outlet conductivity sensor 414 and discard valve 108. Memory means 505 of electronic control means 501 may have a predetermined period of time stored therein which is somewhat longer than the expected maximum time for the water quality to exceed the predetermined level upon start up of the water softening apparatus after a period of nonflow. Electronic control means 501 would then measure the period of time that outlet conductivity sensor 414 indicates the water quality is below the predetermined level and thus is discarded by a discard valve 108. If this length of time exceeds the predetermined period stored in memory means 505, electronic control means 501 would then actuate alarm/service alert means 502 in the manner described above. In addition, electronic control means 501 may be programmed to initiate a regeneration cycle if the length of time that the outlet water has a quality less than the predetermined level as determined by outlet conductivity sensor 414 exceeds a second predetermined length of time which may differ from the first predetermined length of time. Lastly, electronic control means 501 may be programmed to suspend the operation of the water softening apparatus if the length of time during which outlet conductivity sensor 414 indicates the water quality is less than the predetermined level exceeds a third length of time. In conjunction with the embodiment illustrated in FIG. 10, electronic control means 501 may be programmed to switch discard valve 108 to reprocessing line 311 during a time of intermediate water quality for a limited period of time related to the storage capacity of reprocessing holding tank 206. This limited period may be determined by the water flowing through the resin tank as measured by flow volume sensor 401 or it may be a predetermined period of time as measured by clock means 509. Thereafter electronic control means 501 would switch discard valve 108 to drain 303 to discard any intermediate quality water in excess of the amount that could be stored in reprocessing holding tank 206.

Figure 11:
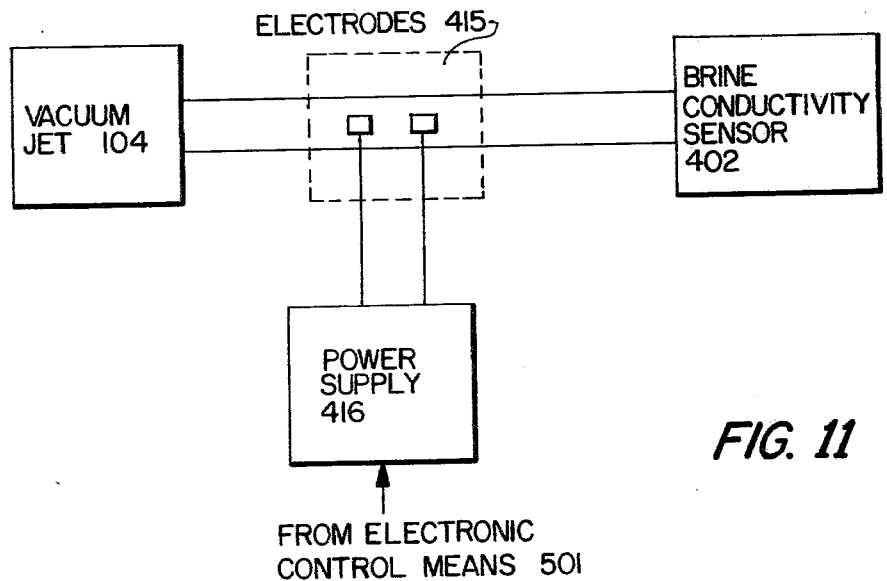
FIG. 11 illustrates a brine electrolysis unit which may be employed in the apparatus of the present invention.

FIG. 11 illustrates a brine electrolysis unit which may be employed to manufacture the sterilization agent needed for control of bacteria and algae in resin tank 201. As noted in FIG. 11, the brine electrolysis unit may be disposed between vacuum jet 104 and brine conductivity sensor 402. In this position the brine electrolysis unit has the dilute brine solution formed in vacuum jet 104 flowing between electrodes 415. During the brining step a signal from electronic control means 501 turns power supply 416 on to apply a voltage to electrodes 415. This voltage serves to produce hypochlorous acid (HOCl) and sodium hpochlorite (NaClO) plus other ion products from the ordinarily employed sodium chloride/water solution. The hypochlorous acid enters resin tank 201 together with the regeneration agent and serves to control the growth of algae and bacteria in the resin. Thus the brine electrolysis unit eliminates the need for a separate sterilization agent tank and sterilization agent control valve such as illustrated in FIG. 1 by producing the required sterilization agent from the brine necessary for regeneration of the resin.

Although the electronic regeneration control means disclosed in the present application has been described in conjunction with a water softening apparatus, those skilled in the art will readily appreciate that the above described technique can be employed in many other applications using ion exchange resins which must be periodically regenerated.

Further, although the electronic control means of the present invention has been described with regard to preferred structural features thereof, it will be understood that various modifications may be made to such specific structural features without departing from the scope of the present invention.

I claim:

1. In a resin-type ion exchange apparatus of the type for removing objectionable ions from a fluid by passing the fluid through a resin in a resin tank, said resin requiring periodic resin regeneration by backwashing the resin with a fluid, brining the resin with a regeneration agent dissolved in a fluid, and rinsing the resin with a fluid, and having at least one electrically actuable valve selectively placable in a backwashing state, a brining state, a rinsing state or a normal operation state, the improvement of an electronically controllable system comprising:

flow volume sensor means for generating a flow volume signal indicative of the volume of fluid passing through said resin;

a memory means for storing therein a predetermied backwashing flow volume, a predetermined brining flow volume, a predetermined rinsing flow volume, at least one further predetermined value, a predetermined value loading program, a regeneration initiation program and a regeneration sequence control program comprising at least the steps of backwashing the resin with said predetermined backwashing flow volume of fluid, brining said resins with said predetermined brining flow volume of a regeneration agent dissolved in a fluid and rinsing said resin with said predetermined rinsing flow volume of fluid;

a microprocessor calculating means connected to said at least one electrically actuable valve, said flow volume sensor means and said memory means, for loading at least some of said predetermined backwashing flow volume, said predetermined brining flow volume, said predetermined rinsing flow volume and said at least one further predetermined value into said memory means according to said predetermined value loading program, for initiating resin regeneration according to said regeneration initiation program and said at least one further predetermined value, and for controlling said resin regeneration by application of valve control signals to said at least one electrically actuable value (1) for placing said at least one electrically actuable valve in said backwashing state until said flow volume signal indicates said predetermined backwasing volume of fluid has passed through said resin tank, (2) for placing said at least one electrically actuable valve in said brining state until said flow volume signal indicates said predetermined brining volume of fluid has passed through said resin tank, (3) for placing said at least one electrically actuable valve in said rinsing state until said flow volume signal indicates said predetermined rinsing volume of fluid has passed through said resin tank, and thereafter (4) for placing said at least one electrically actuable valve in said normal operation state; and a programming means connected to said microprocessor calculating means for application of at least some of said predetermined backwashing flow volume, said predetermined brining flow volume, said predetermined rinsing flow volume and said at least one further predetermined value to said microprocessor calculating means for storing in said memory means.

2. An electronically controllable system as claimed in claim 1, wherein said flow volume sensor means comprises:
a turbine, having a plurality of blades, disposed in a position having the fluid passing through the resin pass therethrough, for turning said plurality of blades through a given degree of rotation volume of fluid passes therethrough; and
a revolution sensing means coupled to said turbine for generating a turbine rotation signal indicative of the rotation of said turbine, said turbine rotation signal being said flow volume signal.

3. An electronically controllable system as claimed in claim 2, wherein:
said blades of said turbine are composed of a metal; and
said revolution sensing means comprises a magnetic proximity detector, disposed in a position having said blades of said turbine rotate therepast, for generating said turbine rotation signal each time one of said plurality of blades rotates therepast.

4. An electronically controllable system as claimed in claim 1, wherein:
said at least one further predetermined value comprises a predetermined regeneration initiation flow volume;
said regeneration initiation program comprises at least the step of initiating resin regeneration when said predetermined regeneration initiation flow volume of fluid has passed through said resin; and
said microprocessor calculating means initiates said resin regeneration when said flow volume signal indicates said predetermined regeneration initiation flow volume has passed through said resin.

5. An electronically controllable system as claimed in claim 1, further comprising:
a fluid hardness sensor means for generating an objectionable ion concentration signal indicative of the concentration of objectionable ions in the fluid applied to said resin; and wherein
said at least one further predetermined value comprises a predetermined regeneration initiation objectionable ion number;
said regeneration initiation program comprises at least the step of initiating resin regeneration when said predetermined regeneration initiation objectionable ion number has been applied to said resin; and
said microprocessor calculating means is further connected to said fluid hardness sensor means, and further controls said resin regeneration by calculating the number of objectionable ions applied to said resin from said flow volume signal and said objectionable ion concentration signal and initiating resin regeneration when said calculated number of objectionable ions equals said predetermined regeneration initiation objectionable ion number.

6. An electronically controllable system as claimed in claim 5, wherein said fluid hardness sensor means comprises:
a fluid sampling means for sampling a predetermined volume of the fluid applied to said resin;
an indicator agent storage means for storing an indicator agent which reacts with said objectionable ions to provide the fluid with a visual density indicative of the concentration of said objectionable ions;
an indicator agent supply means connected to said fluid sampling means and an indicator agent storage means for supplying a predetermined amount of the indicator agent stored in said indicator agent storage means to said sampled predetermined volume of fluid; and
a visual density measuring means for generating a visual density signal indicative of said visual density of said predetermined volume of fluid supplied with said predetermined amount of the indicator agent, said visual density signal being said fluid hardness signal.

7. An electronically controllable system as claimed in claim 6, wherein said visual density measuring means comprises:
a light source;
a photoelectric means, disposed in a position for receiving light from said light source having passed through said predetermined volume of fluid supplied with said predetermined amount of the indicator agent, for generating a photoelectric signal indicative of the amount of light falling thereon, said photoelectric signal being said visual density signal.

8. An electronically controllable system as claimed in claim 1, wherein:
said at least one further predetermined value comprises a predetermined backwashing warning time, a predetermined brining warning time and a predetermined rinsing warning time;
said regeneration sequence control program further comprises the step of generating a warning signal whenever said at least one electrically actuable valve is in said backwashing state for longer than said predetermined backwashing warning time, in said brining state for longer than said predetermined brining warning time or in said rinsing state for longer than said predetermined rinsing warning time;
said microprocessor calculating means includes a clock means for generating a clock signal indicative of the passage of time incorporated therein and further controls said resin regeneration by generating a warning signal when said clock signal indicates the time said at least one electrically actuable valve is in said backwashing state exceeds said predetermined backwashing warning time, when said clock signal indicates the time said at least one electrically actuable valve is in said brining state exceeds said predetermined brining warning time or when said clock signal indicates the time said at least one electrically actuable valve is in said rinsing state exceeds said rinsing predetermined warning time; and
said electronically controllable system further comprises an alarm means connected to said microprocessor calculating means for generating an alarm when said microprocessor calculating means generates said warning signal.

9. An electronically controllable system as claimed in claim 8, wherein said at least one electrically actuable valve is further selectively placable in a nonoperational state, and wherein:
said at least one further predetermined value further comprises a predetermined backwashing shutdown time longer than said predetermined backwashing warning time, a predetermined brining shutdown time longer than said predetermined brining warning time and a predetermined rinsing shutdown time longer than said predetermined rinsing warning time;
said regeneration sequence control program further comprises the step of shutting down the operation of said ion exchange apparatus whenever said at least one electrically actuable valve is in said backwashing state longer than said predetermined backwashing shutdown time, in said brining state longer than said predetermined brining shutdown time or in said rinsing state longer than said predetermined rinsing shutdown time; and
said microprocessor calculating means further controls said resin regeneration by application of a valve control signal to said at least one electrically actuable valve for placing said at least one electrically actuable valve in said nonoperation state when said clock signal indicates the time said at least one electrically actuable valve is in said backwashing state exceeds said predetermined backwashing shutdown time, when said clock signal indicates the time said at least one electrically actuable valve is in said brining state exceeds said predetermined brining shutdown time or when said clock signal indicates the time said at least one electrically actuable valve is in said rinsing state exceeds said predetermined rinsing shutdown time.

10. An electronically controllable system as claimed in claim 1, further comprising:
a brine conductivity sensor means for generating a brine conductivity signal indicative of the conductivity of the regeneration agent dissolved in a fluid employed for brining said resin;
said at least one further predetermined value comprises a predetermined minimum brine conductivity value;
said regeneration sequence control program further comprises at least the step of generating a warning signal when the conductivity of the regeneration agent dissolved in a fluid is less than said predetermined minimum brine conductivity value;
said microprocessor calculating means is further connected to said brine conductivity sensor and further controls said resin regeneration by generation of a warning signal whenever said brine conductivity signal indicates the conductivity of the regeneration dissolved in a fluid is less than said predetermined minimum brine conductivity value; and
an alarm means connected to said microprocessor calculating means for generating an alarm when said microprocessor calculating means generates said warning signal.

11. An electronically controllable system as claimed in claim 10, wherein said brine conductivity sensor means comprises:
a pair of electrodes of a noncorroding material disposed in a position having the regeneration agent dissolved in a fluid passing therebetween;
a DC pulse voltage means for generating a DC pulse waveform having a short duration DC pulse with a low duty cycle and a predetermined voltage;
a polarity reversal means for connecting said pair of electrodes and said DC pulse voltage means for applying said DC pulse waveform to said pair of electrodes and for reversing the polarity of said DC pulse waveform supplied to said pair of electrodes for each successive DC pulse; and
a current measuring means, disposed in a position for measuring the current flowing between said pair of electrodes during said DC pulse, for generating a current signal indicative of the current flowing between said pair of electrodes during said DC pulse, said current signal being said conductivity signal.

12. An electronically controllable system as claimed in claim 10, wherein:
said at least one further predetermined value further comprises a predetermined backwashing warning time, a predetermined brining warning time and a predetermined rinsing warning time;
said regeneration sequence control program further comprises the step of generating a warning signal whenever said at least one electrically actuable valve is in said backwashing state for longer than said predetermined backwashing warning time, in said brining state for longer than said predetermined brining warning time or in said rinsing state for longer than said predetermined rinsing warning time; and said microprocessor calculating means includes a clock means for generating a clock signal indicative of the passage of time incorporated therein and further controls said resin regeneration by generating a warning signal when said clock signal indicates the time said at least one electrically actuable valve is in said backwashing state exceeds said predetermined backwashing warning time, when said clock signal indicates the time said at least one electrically actuable valve is in said brining state exceeds said predetermined brining warning time or when said clock signal indicates the time said at least one electrically actuable valve is in said rinsing state exceeds said predetermined rinsing warning time.

13. An electronically controllable system as claimed in claim 1, wherein said resin-type ion exchange apparatus further includes a fluid outlet for supplying fluid having objectionable ions removed therefrom by passage through said resin to a utilization system and a drain for discarding fluid, and wherein said electronically controllable system further comprises:

an outlet fluid conductivity sensor means for generating an outlet fluid conductivity signal indicative of the conductivity of the fluid supplied by said fluid outlet;

said at least one further predetermined value comprises a predetermined maximum outlet fluid conductivity value;

said memory means further stores a discard program including at least the step of discarding fluid having passed through said resin when the conductivity of the fluid supplied by said fluid outlet exceeds said predetermined maximum outlet fluid conductivity value;

said microprocessor calculating means is further connected to said outlet fluid conductivity sensor means and further controls said resin-type ion exchange apparatus according to said discard program by generating a discard signal when said outlet fluid conductivity signal indicates the conductivity of the fluid supplied by said fluid outlet exceeds said maximum outlet fluid conductivity value; and a discard valve having the fluid passing through said resin applied thereto, connected to said fluid outlet, said drain, and said microprocessor calculating means, for supplying the fluid passing through said resin to said fluid outlet when said microprocessor calculating means is not generating said discard signal and for supplying the fluid passing through said resin to said drain when said microprocessor calculating means is generating said discard signal.

14. An electronically controllable system as claimed in claim 13, wherein:

said at least one further predetermined value comprises a maximum poor quality outlet fluid time;

said regeneration initiation program comprises at least the step of initiating said resin regeneration whenever said outlet fluid conductivity signal indicates the conductivity of the fluid supplied to said fluid outlet is greater than said maximum fluid outlet conductivity value for longer than said maximum poor quality outlet fluid time; and said microprocessor calculating means further includes a clock means for generating a clock signal indicative of the passage of time incorporated therein and further controls said resin regeneration by initiating resin regeneration when said clock signal indicates the time said outlet fluid conductivity signal indicates the conductivity of the fluid supplied to said fluid outlet exceeds said maximum outlet fluid conductivity is longer than said maximum poor quality outlet fluid time.

15. An electronically controllable system as claimed in claim 13, further comprising:

an alarm means connected to said microprocessor calculating means for generating an alarm when said microprocessor calculating means generates said discard signal.

16. An electronically controllable system as claimed in claim 15, wherein:

said at least one further predetermined value further comprises a predetermined backwashing warning time, a predetermined brining warning time and a predetermined rinsing warning time;

said regeneration sequence control program further comprises the step of generating a warning signal whenever said at least one electrically actuable valve is in said backwashing state for longer than said predetermined backwashing warning time, in said brining state for longer than said predetermined brining warning time or in said rinsing state for longer than said predetermined rinsing time;

said microprocessor calculating means includes a clock means for generating a clock signal indicative of the passage of time incorporated therein and further controls said resin regeneration by generating a warning signal when said clock signal indicates the time said at least one electrically actuable valve is in said backwashing state exceeds said predetermined backwashing warning time, when said clock signal indicates the time said at least one electrically actuable value is in the brining state exceeds said predetermined brining warning time or when said clock signal indicates the time said at least one electrically actuable valve is in said rinsing state exceeds said predetermined rinsing warning time; and said alarm means further generates said alarm when said microprocessor calculating means generates said warning signal.

17. An electronically controllable system as claimed in claim 1, wherein said resin-type ion exchange apparatus further includes a fluid outlet for supplying fluid having objectionable ions removed therefrom by passage through said resin to a utilization system and a drain for discarding fluid, and wherein said electronically controllable system further comprises:

an outlet fluid conductivity sensor means for generating an outlet fluid conductivity signal indicative of the conductivity of the fluid supplied by said fluid outlet;

a reprocessing holding tank for holding fluid therein;

said at least one further predetermined value comprises a first outlet fluid conductivity value and a second outlet fluid conductivity value greater than said first outlet fluid conductivity value;

said memory means further stores a discard/hold program including at least the steps of discarding fluid having passed through said resin when the conductivity of the fluid having passed through said resin is greater than said second outlet fluid conductivity value, holding fluid having passed through said resin when the conductivity of the fluid having passed through said resin is greater than said first outlet fluid conductivity value and less than said second outlet fluid conductivity value, and reprocessing held fluid when said outlet fluid conductivity signal indicates the conductivity of the fluid having passed through said resin in less than said first outlet fluid conductivity value;

said microprocessor calculating means is further connected to said outlet fluid conductivity sensor means for further controlling said resin-type ion exchange apparatus according to said discard/hold program by generating a discard signal when said outlet fluid conductivity signal indicates the conductivity of the fluid supplied by said fluid outlet is greater than said second outlet conductivity value, by generating a hold signal when said outlet fluid conductivity signal indicates the conductivity of the fluid supplied by said fluid outlet is greater than said first outlet fluid conductivity value and less than said second outlet fluid conductivity value, and by generating a reprocessing signal when said outlet fluid conductivity signal indicates the conductivity of the fluid supplied by said fluid outlet is less than said first outlet fluid conductivity value;

a discard/holding valve having the fluid passing through said resin applied thereto, connected to said fluid outlet, said drain, said reprocessing holding tank and said microprocessor calculating means, for supplying the fluid passing through said resin to said fluid outlet when said microprocessor calculating means is generating neither said discard signal nor said hold signal, for supplying the fluid passing through said resin to said reprocessing holding tank when said microprocessor calculating means is generating said hold signal and for supplying the fluid passing through said resin to said drain when said microprocessor calculating means is generating said discard signal; and a reprocessing means connected to said resin tank, said reprocessing holding tank and said microprocessor calculating means for supplying fluid held in said reprocessing holding tank to said resin tank for reprocessing by passing through said resin when said microprocessor calculating means generates said reprocessing signal.

18. An electronically controllable system as claimed in claim 17, wherein:

said at least one further predetermined value further comprises a maximum poor quality outlet fluid time;

said regeneration initiation program comprises at least the step of initiating resin regeneration whenever said outlet fluid conductivity signal indicates the conductivity of the fluid supplied to said fluid outlet is greater than said first outlet fluid conductivity for longer than said maximum poor quality outlet fluid time; and said microprocessor calculating means further includes a clock means for generating a clock signal indicative of the passage of time incorporated therein and further controls said resin regeneration by initiating resin regeneration when said clock signal indicates the time said outlet fluid conductivity signal indicates the conductivity of the fluid supplied to said fluid outlet exceeds said first outlet fluid conductivity is longer than said maximum poor quality outlet fluid time.

19. An electronically controllable system as claimed in claim 17, further comprising:

an alarm means connected to said microprocessor calculating means for generating an alarm when said microprocessor calculating means generates either said discard signal or said hold signal.

20. An electronically controllable system as claimed in claim 19, wherein:

said at least one further predetermined value further comprises a predetermined backwashing warning time, a predetermined brining warning time and a predetermined rinsing warning time;

said regeneration sequence control program further comprises the step of generating a warning signal whenever said at least one electrically actuable valve is in said backwashing state for longer than said predetermined backwashing warning time, in said brining state for longer than said predetermined brining warning time or in said rinsing state for longer than said predetermined rinsing time;

said microprocessor calculating means includes a clock means for generating a clock signal indicative of the passage of time incorporated therein and further controls said resin regeneration by generating a warning signal when said clock signal indicates the time said at least one electrically actuable valve is in said backwashing state exceeds said predetermined backwashing warning time, when said clock signal indicates the time said at least one electrically actuable value is in the brining state exceeds said predetermined brining warning time or when said clock signal indicates the time said at least one electrically actuable valve is in said rinsing state exceeds said predetermined rinsing warning time; and said alarm means further generates said alarm when said microprocessor calculating means generates said warning signal.

21. An electronically controllable system as claimed in claims 8, 10, 12, 15, 16, 19 or 20, further comprising:

a service alert means connected to said microprocessor calculating means for actuation in conjunction with the actuation of said alarm means for generating a service alert signal at a location remote from said resin-type ion exchange apparatus.

22. An electronically controllable system as claimed in claim 21, wherein:

said service alert means generates said service alert signal a predetermined period of time after said microprocessor calculating means generates said warning signal.

23. An electronically controllable system as claimed in claim 21, wherein said service alert means comprises:

a failure type encoder means for generating a signal indicative of the state of said resin-type ion exchange apparatus as controlled by said microprocessor calculating means;

a unit encoder means for generating a signal indicative of the particular resin-type ion exchange apparatus with which said electronically controllable system means is associated; and a transmission means connected to said failure type encoder means and said unit encoder means for transmission of a service alert signal indicative of the state of the particular resin-type ion exchange apparatus to a location remote from the resin-type ion exchange apparatus.

24. An electronically controllable system as claimed in claim 23, wherein:

said transmission means comprises a radio transmitter.

25. An electronically controllable system as claimed in claim 1, further comprising:
a brine electrolysis unit connected to said microprocessor calculating means, disposed in a position having said regeneration agent dissolved in a fluid employed in brining said resin passing therethrough, for actuation when said microprocessor calculating means generates said valve control signal for placing said at least one electrically actuable valve in said brining state for production of a sterilization agent by electrolysis of said regeneration agent dissolved in a fluid.

* * * * *